H. J. ZOTTEL.
NUT LOCKING MEANS.
APPLICATION FILED JULY 25, 1913.

1,209,302.

Patented Dec. 19, 1916.

Witnesses:

Inventor:
Herman J. Zottel

UNITED STATES PATENT OFFICE.

HERMAN J. ZOTTEL, OF MILWAUKEE, WISCONSIN.

NUT-LOCKING MEANS.

1,209,302.      Specification of Letters Patent.      Patented Dec. 19, 1916.

Application filed July 25, 1913. Serial No. 781,077.

*To all whom it may concern:*

Be it known that I, HERMAN J. ZOTTEL, a citizen of the United States, residing at Milwaukee, county of Milwaukee, and State of Wisconsin, have invented certain new and useful Improvements in Nut-Locking Means, of which the annexed is a specification.

My invention relates particularly to those nut locking means which do not require any special operation or provision on either bolt or nut but which provide a lock in the form of a separate piece of stamping which will be universally applicable and can be used in securing nuts on machines which are already in use without any disturbance to the nuts proper as the locking means above referred to, screw on the extreme protruding margin of the bolt and bear against the free face of the nut proper.

A further object of my invention is to provide a nut locking means of a very effective, strong, simple and cheap structure, enabling a repeated removal of the locking means and nut proper in such a way as not to injure the finished facings on machine parts, the threads of the bolts or the nuts proper to such an extent as to make repeated usage undesirable.

Figure 1:
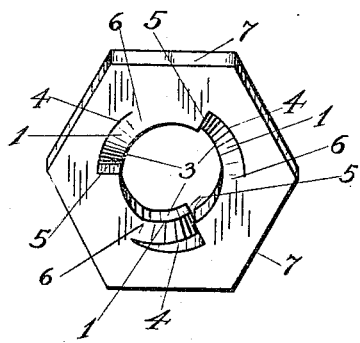
Figure 2:
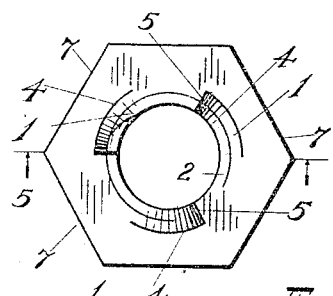
Figure 3:
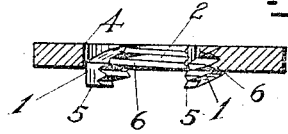
Figure 4:
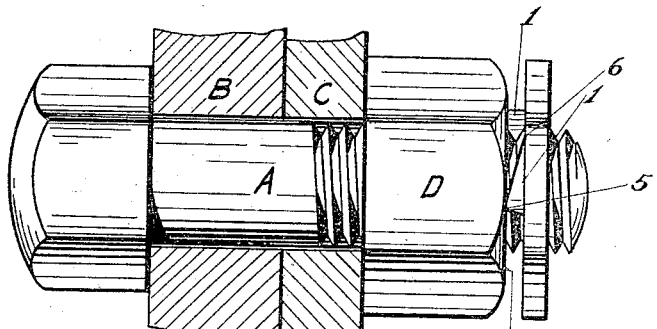

In the accompanying illustration, which forms part of this specification, Figure 1 shows a perspective view of the stamping as it comes from the press, the thread being omitted to show the construction of the nut lock. Fig. 2 shows a plan view of the nut lock as it appears when finished, and Fig. 3 is a vertical sectional view of the same. In Fig. 4 the application of the nut lock in combination with bolt and nut proper are shown.

Like parts will be identified by like characters throughout this specification.

Referring now to Figs. 1, 2 and 3, character 1 shows three pawl-like projections being sheared and formed from the solid blank and owing to the length of their sweep are rendered sufficiently flexible to yield to a certain extent when pressure is brought to bear upon them. Character 2 shows a thread running through the central opening and also adjacent to the walls 3 of the pawls 1. The said pawls are prevented from a radial movement by the sheared walls 4 which however will allow a longitudinal movement of the sheared projections referred to as pawls and particularly the free sheared margins 5 of the said pawls. At character 7 the nut lock is provided with means to apply a wrench. It will be noticed that for a thread having a clockwise direction, the sheared pawls 1 will have an inclination which is anti-clockwise and vice versa.

Having now the nut lock prepared as shown in Figs. 2 and 3, its application is shown in Fig. 4. As regards the nut lock I again refer to the same characters as in Figs. 1, 2 and 3, but letters will be used in referring to parts which are not part of the nut lock proper. At letter "A" I show an ordinary standard bolt passing through and securing together two machine parts "B" and "C" by means of some standard nut "D". It will be apparent that the machine parts "B" and "C" may be replaced by some flexible or loosely mounted members such as a compression spring, etc., and the standard nut "D" can then be locked at any distance from the head of the bolt "A" by means of the nut lock in question.

In practical use the nut proper is first screwed to the desired position or against the facing of some machine part, whereupon the nut lock is screwed on the protruding margin of the bolt "A", and against the free face "E" of the nut "D", preventing in the case of a flexible member between the head of the bolt "A" and the nut "D" a further turning of the nut "D" by means of a wrench. If sufficient force is applied in an effort to bring the free face "E" of the nut "D" closer to the solid margin of the nut lock by screwing the nut lock against the nut proper, the projections 1, and particularly the sheared margins 5 will, due to their shape and pressure upon them, recede to a certain extent and lock upon the threads of the bolt forming small depressions upon said threads of said bolt, which provide very effective preventives against accidental unscrewing of either bolt nut or nut lock. At the same time the sheared margins 5 of the nut lock force, due to their pawl-like shape and pressure upon them, small depressions on the free face "E" of the nut "D", thus providing an additional means to prevent accidental unscrewing or loosening of bolt nut and nut lock. If it is now desired to remove nut "D", the nut-lock is removed first and then the nut proper in the usual way.

In the illustration I show three projections 1, but from one to any practical number of these projections may be made without changing the object of this invention. Attention is also called to the fact that in certain cases where little strength on the part of the nut is required, the ordinary nut "D" may be omitted and this nut-lock be used direct against the facings of the parts to be screwed together the nut-lock in this case becoming a lock-nut.

The features of this nut lock, more particularly the projections 1 and the screw-thread 2 may also be applied to stamped machine parts as in the case where two machine elements are to be secured together by means of a screw or bolt without the use of a primary nut. The sheared and projecting margins in the one machine element then come to bear against the face of the other machine element and the screw or bolt passing through the latter screws into the threaded opening of the former and by applying sufficient pressure between the two elements by means of the bolt the projecting margins are forced upon the thread of the bolt and produce a clamping or locking effect. In this case the features of my invention would be in the form of a bolt lock as it would prevent the bolt from coming loose.

Having now fully described my invention and set forth its purposes, what I claim as new and wish to secure by Letters Patent is:

1. A nut lock comprising a plate having an opening therethrough, the plate being suitably cut to permit a portion of the material being bent to form one or more projections on one side thereof, and a screw thread being formed in the opening and on the projections with the axis thereof substantially at right angles to the plate.

2. In a nut lock, a plate with an opening therein and with one or more radial cuts extending from the opening outwardly and each continued by a segmental cut concentric with the opening, the material defined thereby being offset from the plate to form projections from the side of the plate, and a screw thread being formed in the opening and continued onto the projections.

3. A nut lock comprising a plate having an opening therethrough, the plate being suitably cut to permit a portion of the material being bent to form a plurality of projections from the side thereof, and a screw thread being formed in the opening and continued onto the projections with the axis thereof substantially at right angles to an imaginary plane formed by the apexes of the said projections.

4. A nut lock comprising a plate having an opening therethrough, a locking portion being formed thereon by suitably cutting the plate to permit a portion of the material being bent to protrude from the side thereof, and a screw thread being formed in the opening and continued onto the locking portion with the axis thereof substantially at right angles to the general plane of the plate.

5. A nut lock comprising a plate, the plate being suitably perforated to provide an opening therethrough and permit a portion of the material being offset from the plate to form one or more projections from the side thereof, and a screw thread being formed in said opening and continued onto the projections with the axis thereof substantially at right angles to the general plane of said nut lock.

6. A nut lock comprising a blank having a threaded bolt receiving opening formed therein and one or more pawl-like projections formed thereon by shearing the blank radially from the bolt hole outwardly and the outer end of each of said radial shearings being joined by a second shearing at an angle of approximately ninety degrees to the radial shearing.

7. A nut lock comprising a plate with a circular opening therein, one or more cuts extending approximately radially from said opening outwardly and each joining with an arcuate cut, the material between said radial and said circular cuts being bent from the surface of said plate to form projections on the side thereof, a screw thread formed in said opening and being continuous and uninterrupted on the inner face of said projections, the screw thread in the opening of said plate constituting the holding part, and the threaded projections the compressible means of the locking part.

HERMAN J. ZOTTEL.

Witnesses:
RUDOLPH PFEIL, Jr.,
WILLIAM C. SCHULTZ.